US012625852B1

(12) United States Patent
Silverstein et al.

(10) Patent No.: US 12,625,852 B1
(45) Date of Patent: May 12, 2026

(54) DATABASE TRANSACTION ISOLATION MANAGER

(71) Applicant: International Business Machines Corporation, Armonk, NY (US)

(72) Inventors: Zachary Augustus Silverstein, Georgetown, TX (US); Nadiya Kochura, Bolton, MA (US); Fang Lu, Billerica, MA (US); Jonathan David Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/991,983

(22) Filed: Dec. 23, 2024

(51) Int. Cl.
*G06F 16/21* (2019.01)
*G06F 16/23* (2019.01)

(52) U.S. Cl.
CPC ........ *G06F 16/217* (2019.01); *G06F 16/2343* (2019.01); *G06F 16/2365* (2019.01)

(58) Field of Classification Search
CPC .............. G06F 16/217; G06F 16/2343; G06F 16/2365; G06F 11/3419; G06F 11/3447; G06F 16/2315; G06F 16/2336; G06F 16/2379; G06F 2201/87; G06F 9/466; Y10S 707/99938
USPC ............................. 707/704, 17.007, 999.008
See application file for complete search history.

(56) References Cited

U.S. PATENT DOCUMENTS

| | | | |
|---|---|---|---|
| 6,233,585 B1 * | 5/2001 | Gupta ..................... G06F 9/466 |
| 6,418,438 B1 | 7/2002 | Campbell |
| 6,681,226 B2 | 1/2004 | Bretl et al. |
| 7,469,329 B2 | 12/2008 | Kuczynski et al. |
| 7,640,242 B2 | 12/2009 | Chatterjee et al. |
| 10,025,821 B2 * | 7/2018 | Konik ...................... G06F 16/23 |
| 10,678,785 B1 * | 6/2020 | Anderson ........... G06F 16/2433 |
| 2003/0126200 A1 | 7/2003 | Wolff |
| 2004/0205066 A1 * | 10/2004 | Bhattacharjee ....... G06F 16/283 |

(Continued)

FOREIGN PATENT DOCUMENTS

| | | |
|---|---|---|
| CN | 101667211 B | 4/2011 |
| CN | 109376165 A | 2/2019 |

(Continued)

OTHER PUBLICATIONS

Paul White; "The Lock Escalation Threshold, Part 1"; https://sqlperformance.com/2022/09/sql-performance/lock-escalation-threshold-part-1; Sep. 6, 2022 (Year: 2022).*

(Continued)

*Primary Examiner* — Dennis Truong
(74) *Attorney, Agent, or Firm* — CANTOR COLBURN LLP; Stephen Yoder

(57) ABSTRACT

A computer-implemented method for dynamically determining a database (DB) isolation level of a database generates a transition matrix correlating a set of database transaction types with inter-arrival times, transaction service times, and isolation levels. A probability of success for combinations of transaction type and isolation levels is provided based on the inter-arrival times and transaction service times. Recommended database isolation adjustments are determined based on the probabilities of success. A current database isolation level of the database is adjusted using a database manager based on the recommended database isolation adjustment.

14 Claims, 4 Drawing Sheets

(56)     References Cited

U.S. PATENT DOCUMENTS

| | | | | |
|---|---|---|---|---|
| 2006/0074970 | A1* | 4/2006 | Narayanan | G06F 11/3476 |
| | | | | 707/999.102 |
| 2007/0162449 | A1* | 7/2007 | Manolov | G06F 16/2336 |
| 2011/0320228 | A1* | 12/2011 | Kowalski | G06Q 10/06393 |
| | | | | 705/7.11 |
| 2015/0120687 | A1* | 4/2015 | Bhattacharjee | G06F 16/2343 |
| | | | | 707/704 |
| 2017/0255668 | A1* | 9/2017 | Schnell | G06F 16/273 |
| 2018/0052882 | A1* | 2/2018 | Gnech | G06F 16/2365 |

FOREIGN PATENT DOCUMENTS

| | | |
|---|---|---|
| CN | 115718694 A | 2/2023 |
| CN | 116755847 B | 11/2023 |
| CN | 110399378 B | 7/2024 |
| JP | H05-233415 A | 9/1993 |

OTHER PUBLICATIONS

"Intelligent Insights to monitor and troubleshoot database performance (preview)", retrieved from web https://learn.microsoft.com/en-us/azure/azure-sql/database/intelligent-insights-overview?view=azuresql, Aug. 16, 2024, 10 pages.

"Set Transaction Isolation Level (Transact-SQL)", retrieved from web https://learn.microsoft.com/en-us/sql/t-sql/statements/set-transaction-isolation-level-transact-sql?view=sql-server-ver15, Mar. 20, 2023, 8 pages.

"SQL Read Committed Snapshot Isolation and Dynamics CRM", retrieved from web https://learn.microsoft.com/en-us/archive/blogs/ritesh_ranjan/sql-read-committed-snapshot-isolation-and-dynamics-crm, Sep. 12, 2014, 4 pages.

* cited by examiner

DATABASE TRANSACTION ISOLATION MANAGER

BACKGROUND

The present invention generally relates to database management, and more specifically, to a manager for managing database transaction isolation levels.

A database transaction symbolizes a unit of work, performed within a database management system (or similar system) against a database, that is treated in a coherent and reliable way independent of other transactions. A transaction generally represents any change in a database. Transactions in a database environment have two main purposes. First, to provide reliable units of work that allow correct recovery from failures and keep a database consistent even in cases of system failure. For example, when execution prematurely and unexpectedly stops (completely or partially) many operations upon the database remain uncompleted, with unclear status. Second, to provide isolation between programs accessing a database concurrently. If this isolation is not provided, the programs' outcomes are possibly erroneous.

SUMMARY

Embodiments of the present invention are directed to a computer-implemented method for managing database transaction isolation levels. A non-limiting example of the computer-implemented method includes dynamically determining a database (DB) isolation level of a database generates a transition matrix correlating a set of database transaction types with inter-arrival times, transaction service times, and isolation levels. A probability of success for combinations of transaction type and isolation levels is provided based on the inter-arrival times and transaction service times. Recommended database isolation adjustments are determined based on the probabilities of success. A current database isolation level of the database is adjusted using a database manager based on the recommended database isolation adjustment.

Embodiments of the present invention are directed to a system and a computer program product for implementing and distributing the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
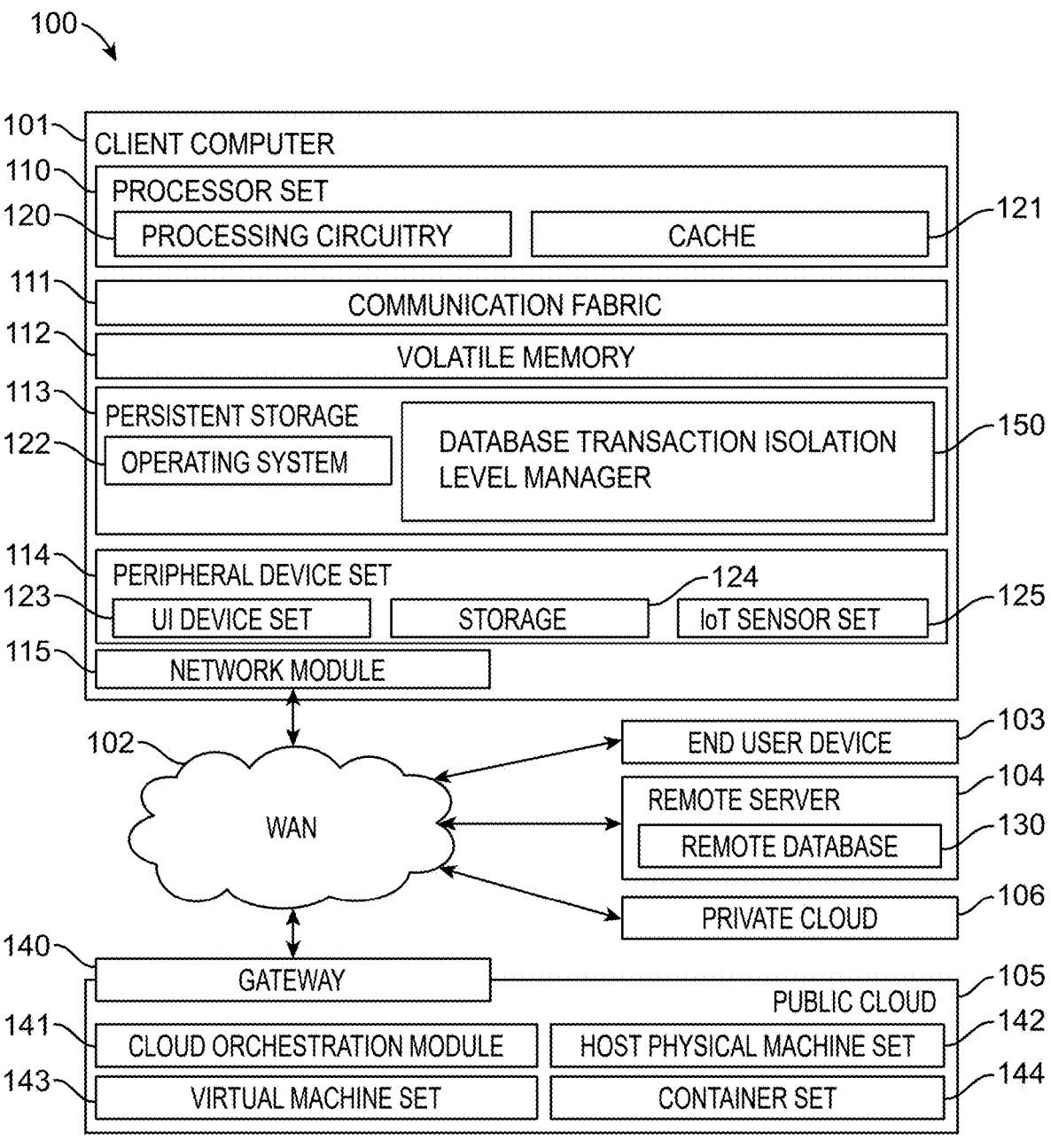
FIG. 1 depicts one exemplary cloud computing system configured to implement the system and method according to one embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Computing environment 100 contains an example of an environment for the execution of at least some of the computer code involved in performing the inventive methods, such as a database transaction isolation level manger at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IOT) sensor set 125), and network module 115. Remote server 104 includes remote database 130. Public Cloud 105 includes gateway 140, Cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 140 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Turning now to an overview of technologies that are more specifically relevant to aspects of the invention, in a database management system, a transaction is a single unit of logic or work, sometimes made up of multiple operations. Any logical calculation done in a consistent mode in a database is known as a transaction. One example transaction is a transfer from one inventory system to another. The complete transaction requires subtracting the amount to be transferred from one entry and adding that same amount to another entry.

When a new transaction is requested of a database while an existing transaction is currently being processed, and both transactions operate on overlapping database entries, errors can occur unless proper isolation is implemented. In order to address this, databases utilize database managers. The database managers provide applications connecting to the database over a network with an exclusive lock to read, write, delete, or update certain data elements within the database while their requested transactions are operating.

Existing systems can lock a database via different mechanisms that have different levels of locking, with how tightly locked down the database is by the mechanism being referred to as the robustness of the mechanism. The robustness of any given mechanism can be categorized as an isolation level. Typically, the more robust that the mechanism being employed is, the greater the reduction in performance of the database resulting from employing the mechanism.

The isolation level determines what types of modifications can be made to database entries while another transaction is being processed by the database. Table 1 illustrates four primary isolation levels, with a most severe isolation level as the top row and a least severe isolation level as the bottom row.

TABLE 1

| Isolation Level | Lost Update | Reading Uncommitted data | Non-Repeatable Read | Phantom Rows |
|---|---|---|---|---|
| Serializable | Not Possible | Not Possible | Not Possible | Not Possible |
| Repeatable Read | Not Possible | Not Possible | Not Possible | Possible |
| Read Committed | Not Possible | Possible | Possible | Possible |
| Read Uncommitted | Not Possible | Possible | Possible | Possible |

As used herein, the isolation levels are referred to numerically. In the example described by Table 1, the serializable isolation is level 4, the repeatable read isolation is level 3, the read committed isolation level is level 2, and the read uncommitted isolation is level 1. In some examples a fifth isolation level (not illustrated) operates as a non-isolated isolation level at level 0.

It is appreciated that the isolation levels described in Table 1 are exemplary in nature, and not exhaustive. Certain database structures may include more or different isolation levels, organized in a similar manner.

Existing database management systems hardcode the database being managed with a single specific isolation level, based on use patterns that the databse is expected to experience. When the isolation level is higher than necessary, database transactions can be slowed down more than is necessary. Alternatively, when the isolation level is too low, database errors can occur.

Hardcoding the database isolation level can further result in inefficiencies when the transaction load and/or type that a database experiences changes due to increased or decreased usage over time.

Turning now to an overview of the aspects of the invention, one or more embodiments of the invention address the above-described shortcomings of the prior art by providing a database manager that sets an initial isolation level and monitors actual transactions in the database. Based on the monitored transactions a model of the database is generated and used to determine a predicted ideal isolation level. The database manager then adopts the predicted ideal isolation level. In some examples, the database manager continues monitoring the database transactions and updating the predicted ideal isolation level in an iterative process until the ideal isolation level converges on a single value or until the database is no longer being utilized.

In yet further examples, once an isolation level has been converged on, the database manager can generate a final database model and generalize the final database model. The generalized model can then be used to set initial isolation levels for similarly structured databases, allowing the similarly structured databases to converge on their ideal isolation level faster.

The examples described herein address shortcomings of the prior art by allowing for the database manager to adjust the isolation levels of the database in real time, as the database is operating. The adjustments are based on actual usage data instead of locking the database at a single isolation level. This, in turn, allows a more flexible balance between performance (e.g., speed of transaction completion) and accuracy (e.g., minimization of transaction errors).

Figure 2:
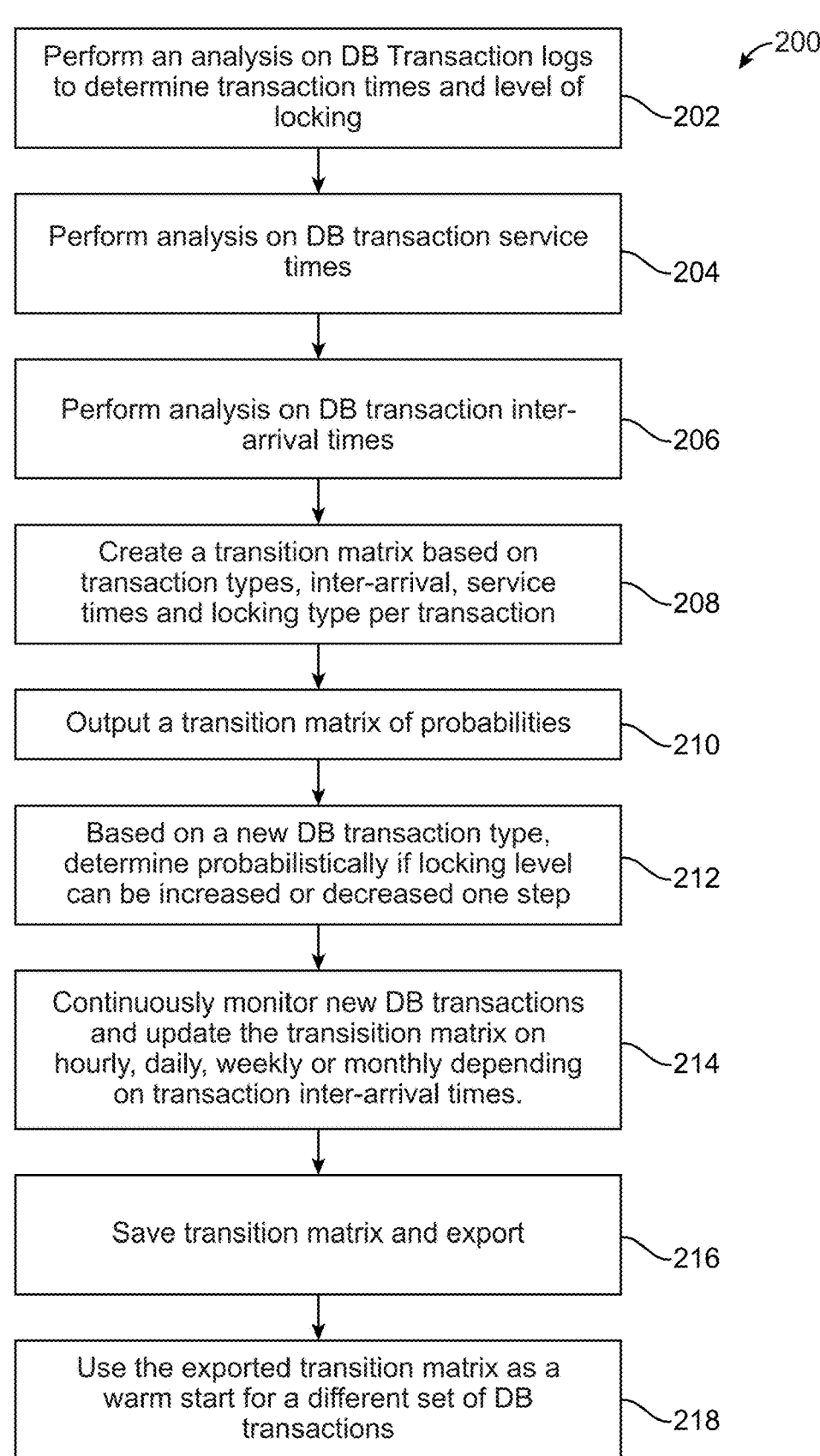
FIG. 2 depicts a high level flow of a database isolation management process according to some examples.
Figure 3:
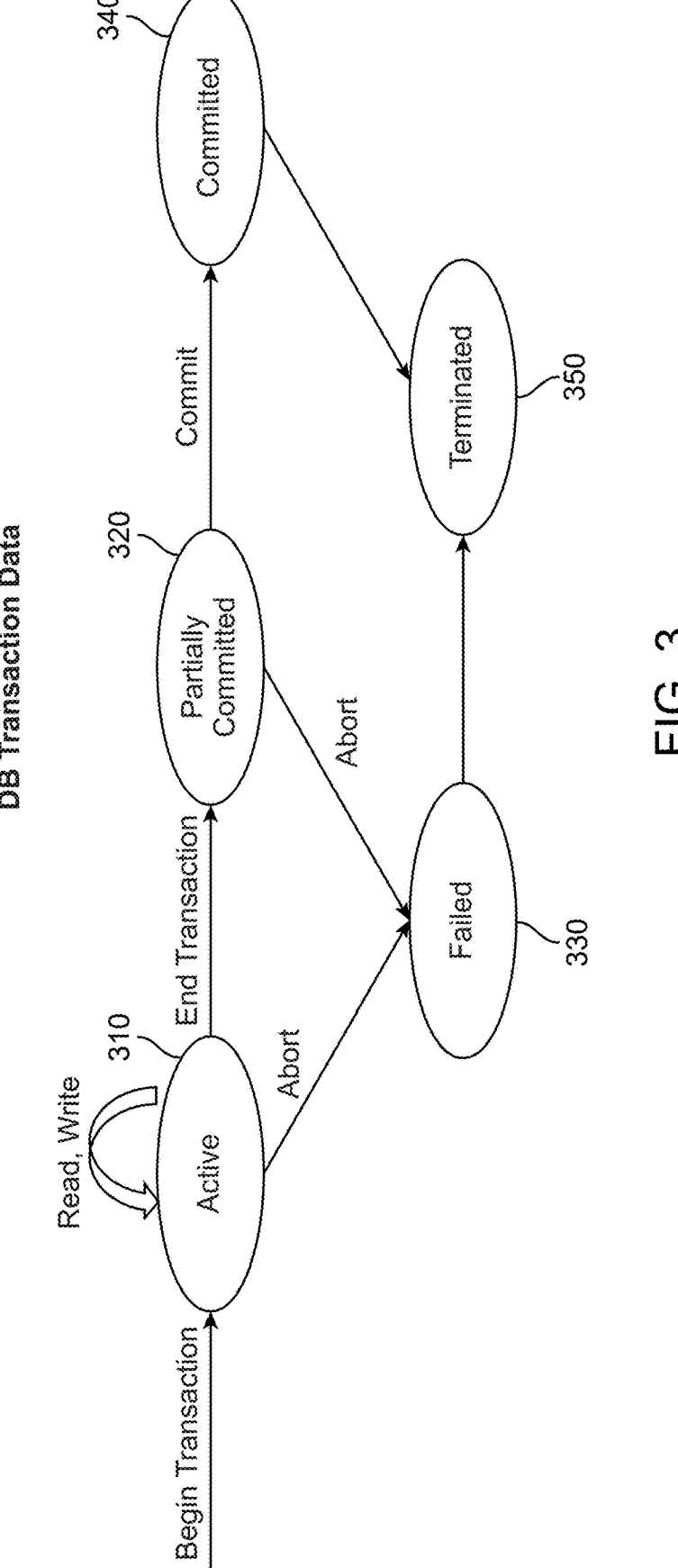
FIG. 3 depicts a flow of database transactions within an exemplary database system.

Turning now to a more detailed description of aspects of the present invention, FIG. 2 depicts a process 200 for operating a database transaction isolation level manger according to embodiments of the invention and FIG. 3 illustrates a transaction flow under the process 200.

Initially the database manager performs an analysis of existing database transaction logs to determined transaction times and a corresponding level of isolation in a step 202. The transaction times include both a transaction interarrival time and a database transaction service time. The transaction interarrival time is the time between receiving a transaction request, and receiving a subsequent transaction request, and the database transaction service time is the length of time required to complete each transaction. In addition to the transaction times and the isolation level of the transaction, the database manager can, in some examples, also track a classification of the transaction with the classification representing what type of transaction is being performed.

In some examples, a timing of discrete portions of each transaction as well as a particular transaction path of each transaction can be further monitored. The transaction is received, and the database begins any necessary read/write operations while the transaction is active (active 310). Either the transaction completes and is partially committed (partially committed 320), or the transaction fails to complete and is aborted (failed 330). Once partially committed 320, the transaction is either fully committed 340, when no errors are detected, or aborted (failed 330) when one or more errors is detected. After the transaction has either failed or been fully committed, the transaction path 300 is terminated. In the example of FIG. 3 the database transaction time is the time from initial receipt of the transaction to when the transaction path is terminated 350.

Referring again to FIG. 2, the database manager analyzes the collected database transaction service times in a first analysis step 204 and analyzes the collected database inter-arrival times in a second analysis 206. In the illustrated example of FIG. 2, the first analysis step 204 and the second analysis step 206 are performed sequentially. It is appreciated that practical examples may perform these analysis steps 204, 206 in either order and/or simultaneously to achieve the same end results.

While discussed with regards to FIG. 2 as providing an analysis of existing transaction data, it is appreciated that the flexible and self learning nature of the process 200, described at steps 210-216, allows the process 200 to be operated using random or approximated data instead of actual previous transactions of the database managed by the database manager.

Based on the analysis, the database manager constructs a transaction matrix correlating all of the transaction types, inter-arrival times, database transaction service times, and isolation levels in a transaction matrix step 208. The transaction matrix is a matrix of joint probabilities of an event occurring given another event. in simple terms P (A|B) is P (Event_Completion|Locking_Level), with P being the probability. The corresponding P is determined using series of experiments with different levels of locking using a series of heterogeneous transaction types. During the experiment the count of successful vs failed transaction types relative to the locking level is measured. The transaction time comes into play as a database will have a default time out in seconds or minutes where a transaction will timeout (fail) if it is not completed in a time below a defined threshold.

The transaction matrix provides a set of probabilities for each possible combination, with the probabilities indicating a likelihood of the transaction reaching a successful completion (fully committed 340 of FIG. 3) in an output transaction matrix probabilities step 210.

Using the probabilities, the database manager determines a probabilistic analysis of whether the isolation level of the database should be increased, decreased, or maintained at the same level in a determine isolation level step 212. In some examples, the database manager is limited to only recommending isolation levels within one step of a current isolation level. By way of example, if the current isolation level is 2, the database manger is limited to recommending an isolation level of 1, 2 or 3. In other implementations, the database manager may recommend an isolation level more than 1 step away. In the latter example, adjustments to the isolation level of the database are made in singular level increments as the database manager transitions to the recommended isolation level.

Throughout operation of the database, new database transactions are continuously monitored and the transaction matrix (of step 208) is updated to reflect the new transactions in a monitoring step 214. The monitoring step 214 updates the transaction matrix at predefined intervals. In some examples, the intervals may be time based with the monitoring step 214 updating the transaction matrix hourly, daily, weekly, or monthly depending on the frequency of transactions. In other examples, the intervals may be transaction based, with the updates occurring every set number of transactions (e.g. every 1000, 10000, or 100000 transactions.). The particular number of transactions for the threshold can be set by one of skill in the art based on the particularities of the database.

The monitoring and updating of the monitoring step 214 is continued until a specific isolation level is converged upon. As used herein an isolation level is considered to have been converged upon when the recommendation is to keep the isolation Once an isolation level has been converged on, the database manager saves a current state of the transaction matrix and exports the saved transition matric to an external transaction matrix repository in an export step 216. During the export step 216, the database manager generalizes the matrix across multiple domain types. The generalization allows the transaction matrix to be utilized across multiple domain types as an isolation template in a warm start step 218.

In the warm start step, 218, a database manager for a new database receives the generalized transaction matrix and begins the process 200 at step 208, thereby providing a faster generation of ideal isolation levels, and providing a more accurate representation of the initial data.

Figure 4:
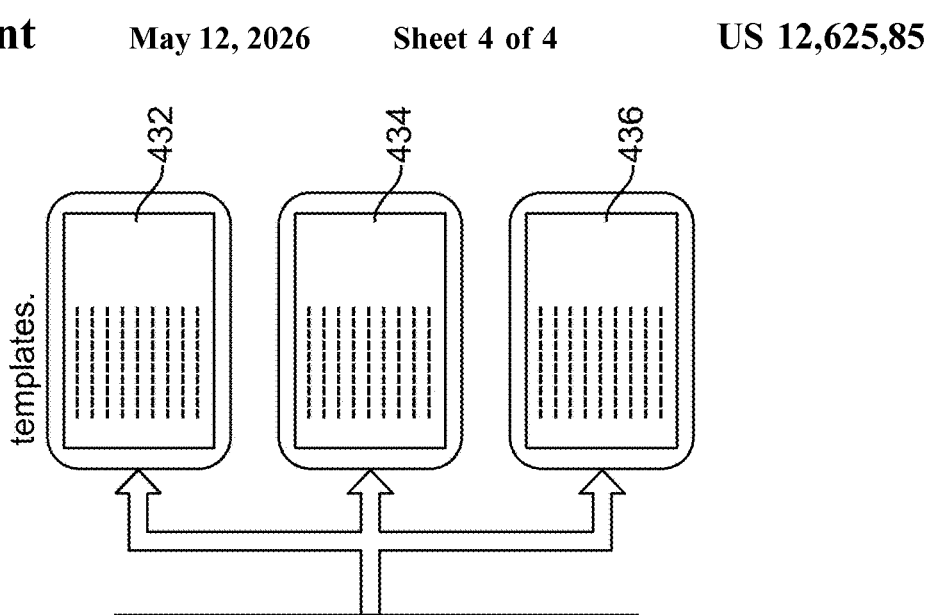
FIG. 4 depicts a process for generalizing the database isolation management process.
Figure 4:
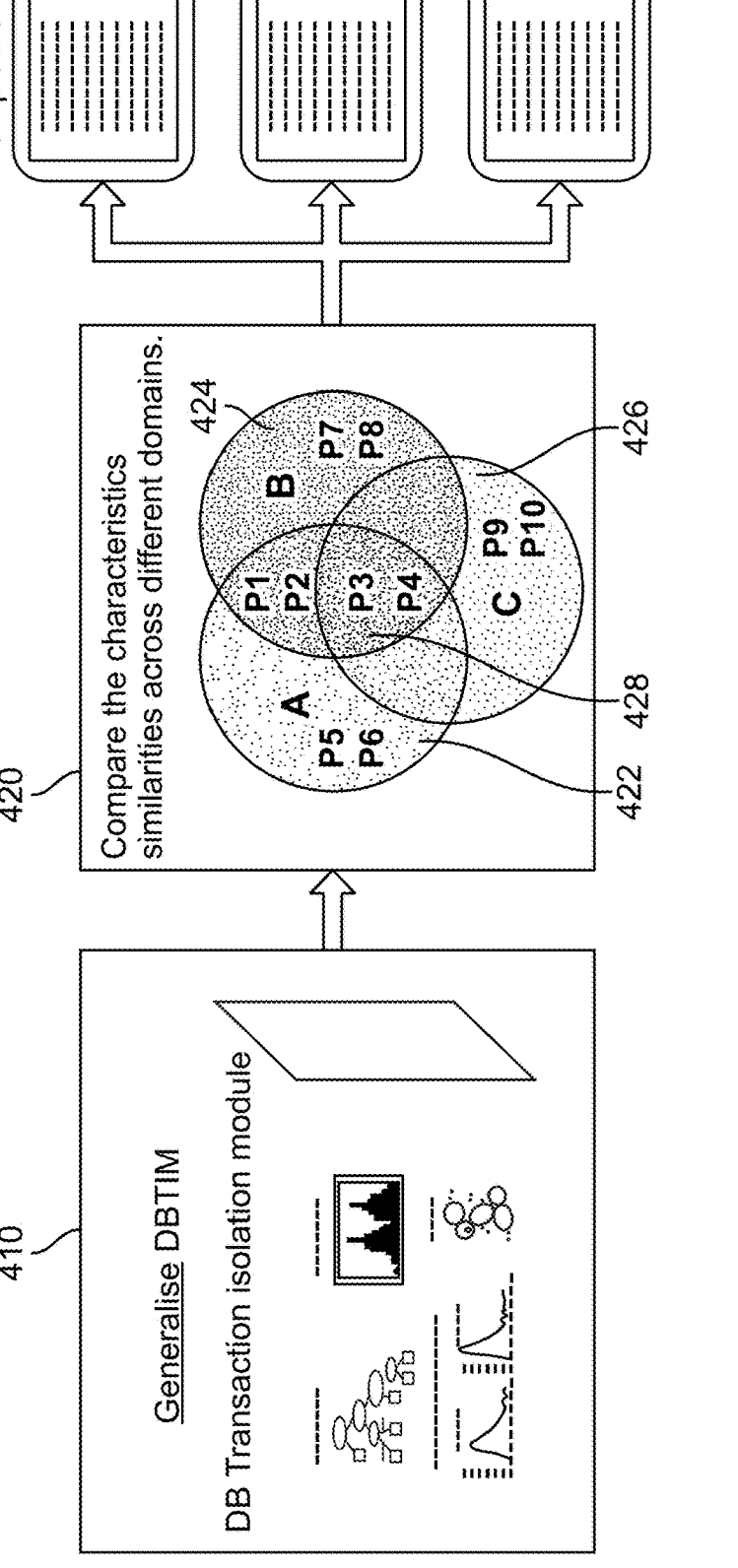

With continued reference to FIGS. 1-2, FIG. 4 illustrates one example of the generalization process. Initially each component of the transaction database is generalized by removing units (e.g. seconds) and other specific measures and labels from the transaction data in an initial generalization step 410. This generalized data is then characterized, and the characterization is applied across different domains 422, 424, 426. The overlapping portions 428 represent areas of the domains 422, 424, 426 where the transaction databases are the same, and those portions of the transaction databases may form a template 430, which is output to databases 432, 434, 436 in each corresponding domain.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for dynamically determining a database (DB) isolation level of a database comprising:

generating a transition matrix correlating a set of database transaction types with inter-arrival times, transaction service times, and isolation levels;

providing a probability of success for each combination of transaction type and isolation level based on the inter-arrival times and transaction service times, wherein the probability of success of each combination of transaction type is P(Event_Completion|Isolation_Level), with P being the probability;

determining recommended database isolation adjustment based on the probabilities of success;

adjusting a current database isolation level of the database using a database manager based on the recommended database isolation adjustment;

operating the database using the adjusted current database isolation level, monitoring live database transactions of the database and updating the transition matrix based on the live database transactions;

reiterating the method for dynamically determining the database (DB) isolation level until the recommended database isolation adjustment converges on no adjustment;

responding to the recommend database isolation adjustment converging on no adjustment by generalizing the transaction matrix by removing units, specific measures, and labels from the transaction data, characterizing the transaction data, and applying the characterization across a plurality of domains of the database;

identifying overlapping domains between the plurality of domains of the database and a plurality of domains of at least one other database and providing the generalized transaction data at the overlapping domains as a generalized transaction matrix and outputting the generalized transaction matrix to at least a second database manager; and providing a probability of success for combinations of transaction type and isolation levels of the at least the second database manager based on inter-arrival times and transaction service times of the generalized transaction matrix, determining recommended database isolation adjustment based on the probabilities of success of the second, adjusting a current database isolation level of the database using a database manager based on the recommended database isolation adjustment.

2. The computer-implemented method of claim 1, wherein the recommended database isolation adjustment is limited to recommending changing a current database isolation level by at most one level.

3. The computer-implemented method of claim 1, wherein the recommended database isolation adjustment is greater than one level difference from a current database isolation level, and wherein adjusting the current database isolation level comprises adjusting the current database isolation level by one level towards a recommended database isolation level.

4. The computer-implemented method of claim 1, further comprising responding to the recommended database isolation adjustment converges on no adjustment by locking the database at the current database isolation level.

5. The computer-implemented method of claim 1, wherein an initial database transaction matrix includes one of random and approximated data.

6. The computer-implemented method of claim 1, wherein an initial database transaction matrix includes a generalized transaction matrix based from a second database manager.

7. A computer program product comprising:

a non-transitory memory storing instructions for causing a database manager to preform a operations for dynamically determining a database (DB) isolation level of a database, the operations including:

generating a transition matrix correlating a set of database transaction types with inter-arrival times, transaction service times, and isolation levels;

providing a probability of success for combinations of transaction type and isolation levels based on the inter-arrival times and transaction service times;

determining recommended database isolation adjustment based on the probabilities of success;

adjusting a current database isolation level of the database using a database manager based on the recommended database isolation adjustment;

operating the database using the adjusted current database isolation level, monitoring live database transactions of the database and updating the transition matrix based on the live database transactions;

reiterating the method for dynamically determining the database (DB) isolation level until the recommended database isolation adjustment converges on no adjustment;

responding to the recommend database isolation adjustment converging on no adjustment by generalizing the transaction matrix by removing units, specific measures, and labels from the transaction data, characterizing the transaction data, and applying the characterization across a plurality of domains of the database;

identifying overlapping domains between the plurality of domains of the database and a plurality of domains of at least one other database and providing the generalized transaction data at the overlapping domains as a generalized transaction matrix and outputting the generalized transaction matrix to at least a second database manager; and providing a probability of success for combinations of transaction type and isolation levels of the at least the second database manager based on inter-arrival times and transaction service times of the generalized transaction matrix, determining recommended database isolation adjustment based on the probabilities of success of the second, adjusting a current database isolation level of the database using a database manager based on the recommended database isolation adjustment.

8. The computer program product of claim 7, wherein the recommended database isolation adjustment is limited to recommending changing a current database isolation level by at most one level.

9. The computer program product of claim 7, wherein the recommended database isolation adjustment is greater than one level difference from a current database isolation level, and wherein adjusting the current database isolation level comprises adjusting the current database isolation level by one level towards a recommended database isolation level.

10. The computer program product of claim 7, wherein the operations further comprise responding to the recommended database isolation adjustment converges on no adjustment by locking the database at the current database isolation level.

11. The computer program product of claim 7, wherein an initial database transaction matrix includes one of random and approximated data.

12. The computer program product of claim 7, wherein an initial database transaction matrix includes a generalized transaction matrix based from a second database manager.

13. A computer system comprising:

a processor set and a memory, the memory storing a database and a database manager, the database manager being configured to control an isolation level of the database; and the memory further storing instructions for causing the processor to generate a transition matrix correlating a set of database transaction types with inter-arrival times, transaction service times, and isolation levels, provide a probability of success for combinations of transaction type and isolation levels based on the inter-arrival times and transaction service times, determine recommended database isolation adjustment based on the probabilities of success, and adjust a current database isolation level of the database using a database manager based on the recommended database isolation adjustment, operate the database using the adjusted current database isolation level, monitoring live database transactions of the database and updating the transition matrix based on the live database transactions;

reiterate the method for dynamically determining the database (DB) isolation level until the recommended database isolation adjustment converges on no adjustment;

respond to the recommend database isolation adjustment converging on no adjustment by generalizing the transaction matrix by removing units, specific measures, and labels from the transaction data, characterizing the transaction data, and applying the characterization across a plurality of domains of the database;

identify overlapping domains between the plurality of domains of the database and a plurality of domains of at least one other database and providing the generalized transaction data at the overlapping domains as a generalized transaction matrix and outputting the generalized transaction matrix to at least a second database manager; and provide a probability of success for combinations of transaction type and isolation levels of the at least the second database manager based on inter-arrival times and transaction service times of the generalized transaction matrix, determining recommended database isolation adjustment based on the probabilities of success of the second, adjusting a current database isolation level of the database using a database manager based on the recommended database isolation adjustment.

14. The computer system of claim 13, wherein the processor set and the memory are connected to at least one other computer system, and wherein the memory further stores instructions for causing the processor to generalize the transaction matrix and output the generalized transaction matrix to at least a second database manager stored in a memory of the at least one other computer system.

* * * * *